April 28, 1964    V. E. YOUNG    3,130,772
TIRE REMOVAL TOOL
Filed Oct. 9, 1961
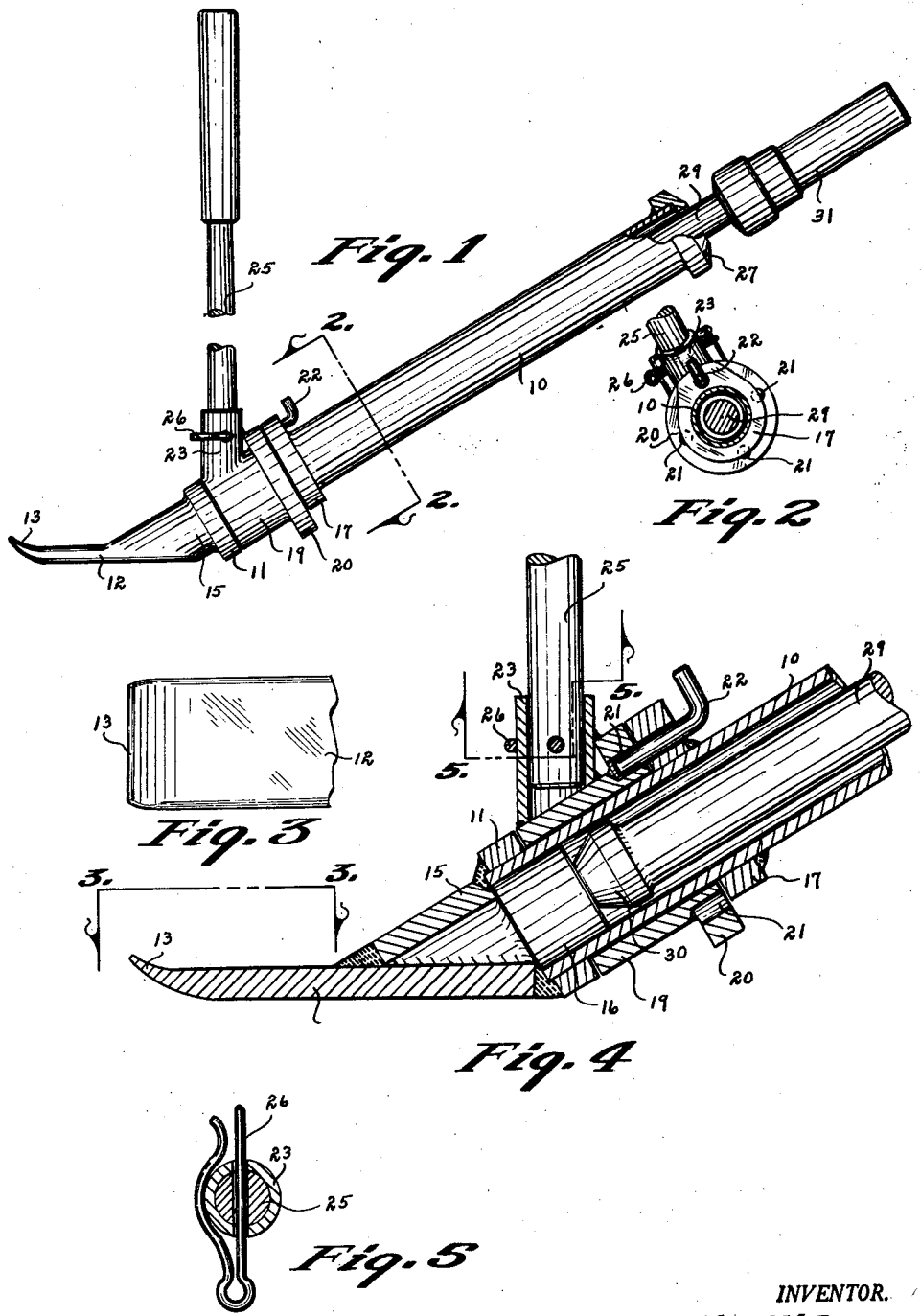
INVENTOR.
VIRGIL E. YOUNG
BY
Talbert Dick & Darley
ATTORNEYS
WITNESS
NORMAN G. TRAVISS

3,130,772
TIRE REMOVAL TOOL
Virgil E. Young, 1912 S. 15th St., Fort Dodge, Iowa
Filed Oct. 9, 1961, Ser. No. 143,958
2 Claims. (Cl. 157—1.17)

This invention relates to a pneumatic tire removal tool and more particularly to a single unit tool that requires no addititonal auxiliary supporting equipment.

The changing of tires from and onto a wheel rim is a difficult task. Perhaps the most difficult phase is the "breaking" of the bead portion of the tire from the rim trough. The usual procedure is to hammer a flat tire tool into place between the bead of the tire and the wheel. Even when this is accomplished, the usual tire tool is inadequate for the manual prying and stretching of the tire bead.

Therefore one of the principal objects of my invention is to provide a one unit tool that may be easily and quickly handled and manipulated for facilitating the removal of a pneumatic tire from a wheel rim.

A still further object of this invention is to provide a tire removal tool that has incorporated in its construction an effective hammering means.

A still further object of this invention is to provide a tire removal tool that has an adjustable handle means for facilitating the lateral rotation of the unit.

A still further object of this invention is to provide a tire removal tool that may be successfully manipulated by the two hands of a single workman.

Still further objects of my invention are to provide a tire removal tool that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a side view of my tire removal tool with sections cut away to more fully illustrate its construction;

FIG. 2 is a cross-sectional view of my device taken on line 2—2 of FIG. 1;

FIG. 3 is a top view of the blade portion taken from line 3—3 of FIG. 4;

FIG. 4 is an enlarged longitudinal sectional view of the forward end portion of the device; and FIG. 5 is a cross-sectional view taken on line 5—5 of FIG. 4.

In these drawings I have used the numeral 10 to designate the basic portion of the device and which is in the form of an elongated tube or cylinder. On the forward end area of this cylinder is a collar 11. The flat blade for extending in front of or under the bead of a tire (not shown) is generally designated by the numeral 12. The outer free end portion 13 of the blade 12 extends upwardly and forwardly in a curved path when the tool is in the position shown in FIG. 4. This free end portion is sharpened and its two corner edges are rounded as shown in FIG. 3. The bottom of the blade 12 is flat and straight and this bottom straight surface is at an angle to the longitudinal axis of the cylinder 10 as shown in FIG. 1. By this arrangement of parts, when the tool is in the position shown in FIG. 1, the cylinder 10 will be extending upwardly and rearwardly, the flat bottom of the blade will be extending horizontally, and the sharpened tip end 13 of the blade will be extending upwardly and forwardly. The sides of the blade are rounded so that the tire will not be damaged if and when the tool is laterally rotated. To further protect the tire against damage, the rear end portion of the blade blends into base portion 15 which is circular in cross section. This base portion 15 is rigidly secured onto the forward end of the cylinder 10. Rigidly secured in the forward end of the cylinder 10, is a block 16. The numeral 17 designates a collar on the forward end area of the cylinder 10. This fixed collar 17 is spaced apart from and back of the fixed collar 11. The numeral 19 designates a collar rotatably embracing the forward end area of the cylinder 10, and positioned between the two collars 11 and 17. This collar 19 has a radially extending flange ring 20. Extending into the flange ring 20 is a plurality of spaced apart holes 21. The numeral 22 designates a pin slidably extending through the collar 17, and selectively slidably extending into one of the holes 21. By this construction, the collar 19 may be selectively locked against rotation in various positions of its rotation on the cylinder 10, merely by selecting the proper hole 21 for the pin 22 to engage. Secured to and extending from the collar 19 is a stub pipe 23. This pipe 23 extends at an angle to the longitudinal axis of the cylinder 10 and when the tool is in the position shown in FIG. 4, it will extend directly upwardly. By positioning the collar 19, this pipe 23 may be positioned laterally in either direction. The numeral 25 designates an elongated handle having one end detachably slidably extending into the stub pipe 23. It may be locked in position by a safety pin or like 26, extending through the pipe 23 and handle 25 as shown in FIG. 5.

The numeral 27 designates a collar cap rigidly secured on the rear end of the cylinder 10. The numeral 29 designates a shaft slidably extending through the cap 27 and slidably into the cylinder 10. The numeral 30 designates a hammer head on the forward end of the shaft 29 and which is adapted to strike the block 16. Also this enlarged head prevents the complete withdrawal of the shaft 29 from the cylinder 10. The diameter of the head 30 is less than that of the inside diameter of the cylinder 10 in order that air may freely pass by the head 30 when the shaft 29 is reciprocated. The numeral 31 designates a handle portion on the rear outer end of the shaft 29.

To use my device one hand grasps the handle 25 and the other hand grasps the handle 31. The blade tip portion 13 is guided into position relative to the tire, and the handle 31 is reciprocated to hammer on the block 16. Obviously this hammering action drives the unit forwardly. However, by the two handles the unit is always under the complete control of the user. When it is desired to rotate the blade laterally in either direction, it is merely necessary to laterally swing the handle 25 accordingly. The hammer head striking the rear cap will facilitate the removal of the tool. By adjusting the rotation of the collar 19, the desired position of the handle 25 is obtained. For shipment and storage the handle 25 may be detached.

Some changes may be made in the construction and arrangement of my tire removal tool without departing from the real spirit and purpose of my invention, and it is my intention to cover by my claims, any modified forms of structure or use of mechanical equivalents which may be reasonably included within their scope.

I claim:
1. In a tire tool,
   (a) a cylinder having a closed forward end,
   (b) a blade on the forward end of said cylinder,
   (c) two spaced apart fixed collars embracing the forward end area of said cylinder,
   (d) a collar rotatably embracing said cylinder and between said two fixed collars,

(e) a handle member operatively secured to said rotatable collar,
(f) a flange ring on said rotatable collar having a plurality of spaced apart holes,
(g) a pin slidably extending through one of said fixed collars and selectively slidably into one of the holes of said flange ring,
(h) and a shaft hammer slidably mounted in said cylinder, said shaft hammer having one end thereof engageable with said cylinder closed end.

2. In a tire tool,
(a) a cylinder having a closed forward end,
(b) a blade on the forward end of said cylinder,
(c) two spaced apart fixed collars embracing the forward end area of said cylinder,
(d) a collar rotatably embracing said cylinder and between said two fixed collars,
(e) a handle member operatively secured to said rotatable collar,
(f) a flange ring on said rotatable collar having a plurality of spaced apart holes,
(g) a pin slidably extending through one of said fixed collars and selectively slidably into one of the holes of said flange ring,
(h) a shaft hammer slidably mounted in said cylinder,
(i) an enlarged head on the forward end of said shaft hammer having a diameter less than that of the inside diameter of said cylinder and engageable with said closed forward end,
(j) and a handle portion on said shaft hammer.

References Cited in the file of this patent
UNITED STATES PATENTS

| | | |
|---|---|---|
| 739,608 | Kotten | Sept. 22, 1903 |
| 1,411,365 | Mitchell | Apr. 4, 1922 |
| 1,507,208 | Schlenker | Sept. 2, 1924 |
| 2,582,390 | Moore | Jan. 15, 1952 |
| 2,628,669 | Stubler | Feb. 17, 1953 |
| 2,684,113 | Davidson | July 20, 1954 |
| 3,008,512 | Foster | Nov. 14, 1961 |